Jan. 28, 1936.                                   A. MOORE                              2,028,989
                 APPARATUS FOR AND PROCESS OF OPERATING INTERNAL
                     COMBUSTION ENGINES ON FUEL OF LOW VOLATILITY
                              Filed Aug. 1, 1930                    2 Sheets-Sheet 1
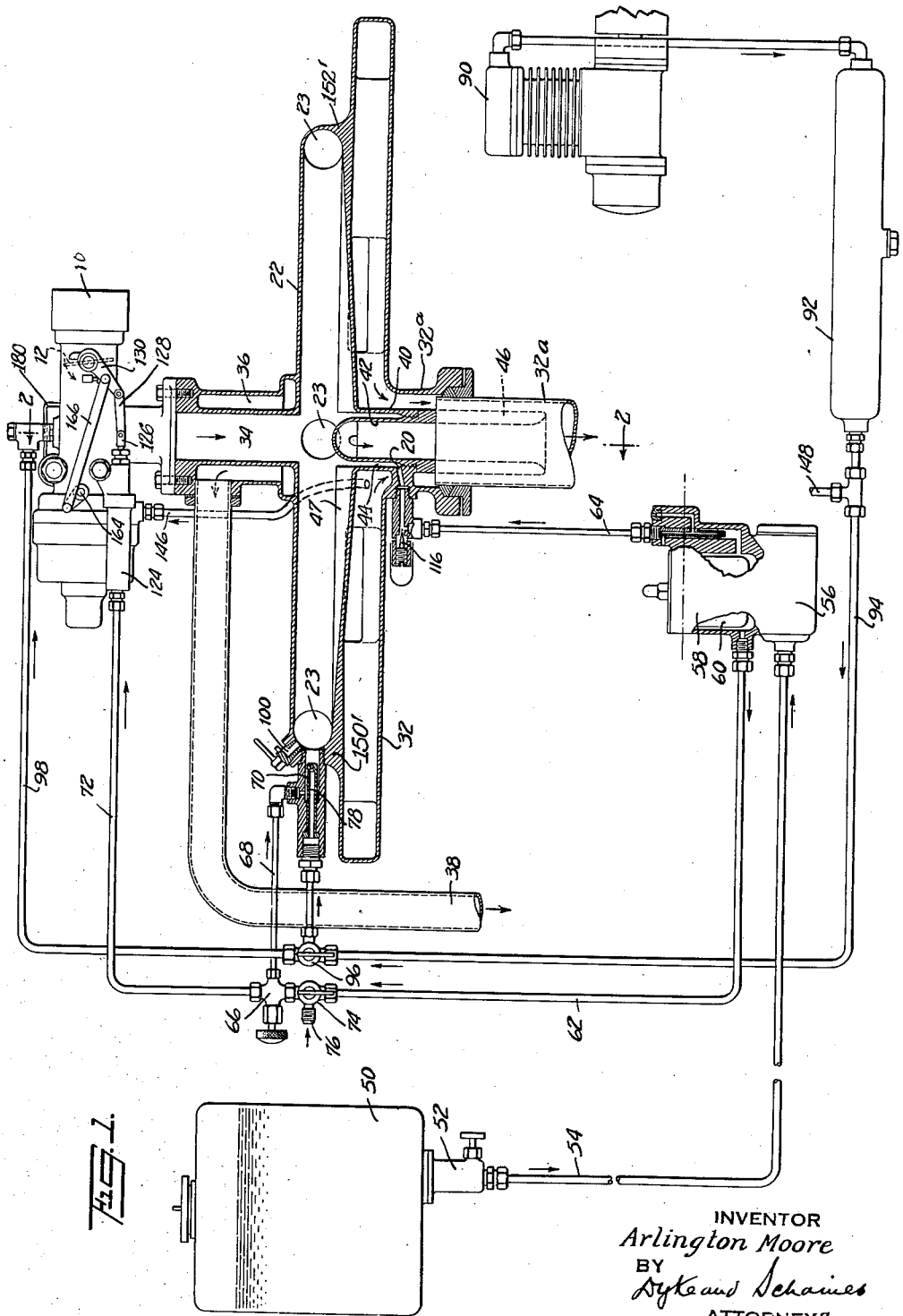
INVENTOR
*Arlington Moore*
BY
*Dyke and Schames*
ATTORNEYS

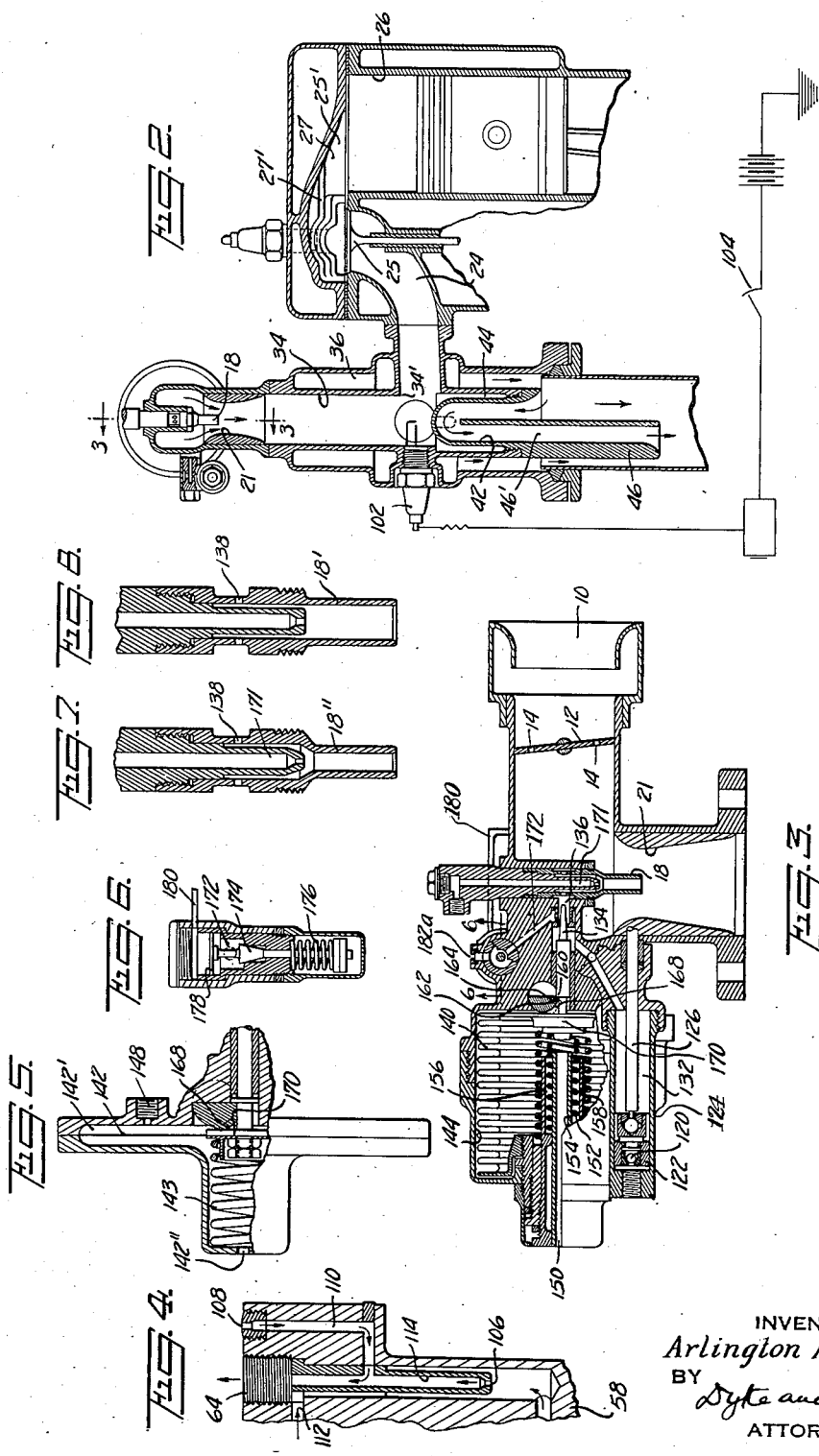

Patented Jan. 28, 1936

2,028,989

UNITED STATES PATENT OFFICE 2,028,989

APPARATUS FOR AND PROCESS OF OPERATING INTERNAL COMBUSTION ENGINES ON FUEL OF LOW VOLATILITY

Arlington Moore, New York, N. Y., assignor, by mesne assignments, to Maxmoor Corporation, New York, N. Y., a corporation of Delaware Application August 1, 1930, Serial No. 472,310

46 Claims. (Cl. 123—119)

My invention relates to an apparatus for and a process of operating internal combustion engines on fuel of low volatility, in which premixed charge material is distributed to the several cylinders.

The low fuel cost and substantial freedom from fire hazard to be obtained with such fuel, for example, fuel oil of 28° Baumé, makes the utilization of fuel of low volatility a matter of great advantage for the operation of internal combustion engines, particularly automotive engines.

The use, however, of such fuel has heretofore not been found practical, except in engines of the Diesel and the like type, particularly because of failure, under some or other of the various conditions of engine operation, to vaporize the heavy fuel and keep same vaporized or in a state of homogeneous suspension in the air of the charge.

It is the principal object of the present invention to provide an apparatus and process in which, throughout all conditions of engine operation, from idling to full power running, the heavy fuel is efficiently put into and kept in a vaporized or suspended state in the air until cleanly and efficiently burned in the engine cylinders to which distributed.

Another object is to pulverize the fuel and project it into and through the air stream into engagement with a heated surface whereby the lighter particles of pulverized fuel are largely suspended in the air stream at first contact therewith, and the heavier particles broken up and suspended therein upon striking the heated surfaces.

Another object is to impart such a high initial state of vaporization to the fuel for idling and low fractional loads that during such operation the fuel will remain in homogeneous admixture with the air until burned in the engine cylinders.

Another object is to effect a substantially correct metering of the fuel for all conditions of engine operation.

Other objects of the invention will appear as the description proceeds.

While the process of my invention is not limited to use of particular apparatus, it can be described most conveniently and simply by reference to an apparatus by which the process can be carried into effect. Such an apparatus is shown in the accompanying drawings, in which:

Figure 1 is a diagrammatical view, partly in cross-section, of the engine manifolds, and fuel supplying apparatus;

Fig. 2 is a transverse section on line 2—2 of Fig. 1;

Fig. 3 is a section along the lines 3—3 of Fig. 2;

Fig. 4 is an enlarged sectional view of the means for supplying idling and compensating fuel, shown in reduced scale in the lower central portion of Fig. 1;

Fig. 5 is a fragmentary view similar to a portion of Fig. 3, and illustrates control of the fuel passage valving means by a diaphragm instead of the bellows shown in Fig. 3;

Fig. 6 is a section approximately on line 6—6 of Fig. 3;

Fig. 7 is an enlarged section of the main fuel nozzle shown in the upper central portion of Fig. 3; and Fig. 8 is a view similar to Fig. 7 showing a modified form of main fuel nozzle.

In the illustrated apparatus, the air of the charge, admitted through the silencer 10, is controlled by throttle 12, having balanced holes 14 therein for passage of idling air. The fuel is supplied through the downwardly directed main fuel nozzle 18, and the auxiliary nozzle 20 for the upwardly moving supply of idling and compensating fuel. Fuel nozzle 18 is preferably located at the throat of a Venturi passage 21. The charge passes through the intake manifold 22 and outlets 23 thereof, through the valve ports 24 controlled by the intake valves 25, into the combustion chambers 25' of cylinders 26 having cylinder heads 27 of preferably stepped form as indicated at 27' and adapted to minimize detonation. The exhaust manifold 32 is arranged to supply heat to the intake manifold by surrounding the neck 34 of the intake conduit with an extension 36 of the exhaust manifold vented to the air through the outlet pipe 38, and by forming the floor and ends of the intake manifold 22 integral with the adjacent top portion of the exhaust manifold. The neck 34 is terminated in a sharp angle as indicated at 34' to shed off any liquid fuel from the neck wall into the air stream, and this arrangement is especially desirable when the intake is constructed with a central outlet 23, as in the structure illustrated herein, which could be directly entered by liquid fuel running down the manifold wall.

The supply of heat from the exhaust to the under side of the intake manifold is concentrated at a region opposite the intake manifold neck 34 by conducting the exhaust gas from the exhaust ports towards a central outlet 32ᵃ in line with the mouth of the downwardly directed main fuel nozzle 18. The heat concentrating arrangement comprises a cup or crucible extension 40, projecting downwardly into the exhaust conduit and outlet 32ª from the intake manifold floor, and having therein an upwardly projecting hollow dome 42, exposed on its interior to the hot exhaust gases, said crucible wall and dome wall providing between them an annular well 44, subject to the most concentrated heat from the exhaust gases on both sides. The dome 42 has an elongated skirt 46 integral therewith and extending for a material distance downwardly in the concentrated stream of the hot exhaust gases, and provided with a substantially U-shaped passage 46', arranged with its inlet higher than the outlet, to thereby promote circulation and travel of exhaust gases therethrough. The massive metal member 46 of copper or the like serves as a thermal reservoir for uniform supply of heat to the dome 42 by conduction.

Inclined grooves 47 drain any liquid fuel accumulating in the manifold back into the annular well 44, or cause the fuel therein to rejoin the air stream by the heat of the exhaust to which the groove walls are directly exposed. Such grooved constructions decrease in cross-section towards the ends of the manifold branches to progressively reduce the section of the intake manifold passages in direction toward the end outlets thereof, thereby serving to maintain high velocity of charge travel as it moves toward the valve ports. Said well 44 is vented to the atmosphere preferably through the passage 20, said passage serving also as an orifice for admission of fuel for idling.

The fuel supply is from tank 50, from which tank, when elevated, the fuel strained at 52 flows by gravity through a pipe 54, passes through a second strainer at 56, and into the low-down constant level fuel supply chamber 58 containing the float 60. In case tank 50 is below the chamber 58, the fuel supply to the latter can be by a pump or other fuel raising means. The constant level supply chamber 58 is preferably located, in the case of an automotive vehicle engine, for example, directly under the fueling device, which I designate a blast charger, so that the height for fuel lifting is independent of the road angle.

The main fuel jet 18, and the idling fuel jet 20 are supplied from the chamber 58, the former through pipe 62, and the latter through pipe 64. Pipe 62 contains a needle valve 66 by which fuel from the chamber 58 going through pipe 72 to the main fuel nozzle 18 can be admitted through pipe 68 to the preheating nozzle 70. There is also a two-way cock 74 in the pipe line 62, and when the valve 66 is turned into such position as to admit fuel through pipe 68 to the preheating nozzle 70, said nozzle 70 may be supplied with fuel oil through pipe 62, or the two-way valve 74 may be turned into its other position so that gasoline or other volatile fuel for starting may be supplied to preheating nozzle 70 or to nozzle 18, as by connecting a supply thereof to nipple 76 provided for this purpose.

The preheating nozzle 70 connected to one end of the intake manifold is directed axially thereof and the fuel is discharged from such nozzle lengthwise of the intake manifold. The preheating nozzle 70 is supplied with a central blast tube 78 receiving air from a compressor 90, which is run by the internal combustion engine fuel, and at a speed varying directly therewith, and is provided for the principal purpose of blasting in the fuel supplied through nozzle 18.

The air compressor may, if desired, comprise additional special pressure cylinders in the engine itself, with pistons operated directly from the engine crankshaft. The compressed air is delivered to blast tube 78 through the equalizer 92, pipe connection 94, and two-way valve 96, said valve 96 being adapted when in its other position to supply such blasting air through the pipe 98 to the main fuel nozzle. The manually operated air valve 100 is provided in relatively close proximity to the nozzle system 70—78 for admitting air for supporting of combustion of the fuel delivered by the starting nozzle 70, and preventing the air from 34 drawn towards the jet 70 by the suction action from quenching the flame.

When both starting and warming up on gasoline the engine may be operated during such interval as in the ordinary manner of operation of internal combustion engines on gasoline fuel either by operation of nozzle 18 or by passing the fuel through nozzle 70 into the intake passage without ignition and not being ignited until this is done by the customary spark plugs in the engine cylinders, valve 96 for compressed air being in position to supply same to blast tube 78, and the throttle being opened to supply the requisite air. A few moments of such operation suffices to heat the cylinders and manifolds sufficiently to permit switching over to oil fuel. In case of using the heavy oil fuel for the preliminary heating up of intake passages and engine cylinders, such oil fuel supplied to starting nozzle 70, and blasted by the compressed air, is ignited in the intake manifold by spark plug 102, located at about the center of the intake manifold, and at a sufficient distance from nozzle 70 to permit the firing of the fuel, the circuit thereof being closed by switch 104.

During the period required to warm up the engine, the engine is turned over, as by means of a starting motor, and air for combustion is supplied by opening the throttle to such extent as is required, the air valve 100 being manually opened. Upon the motor being warmed sufficiently to assure proper vaporization of the heavy fuel, the supply of fuel is shut off by valve 66 from the preheating nozzle 70 so that the fuel supply is open only to the main nozzle 18, the supply of compressed air changed from tube 78 to the main blasting nozzle by means of valve 96, the circuit of spark plug 102 opened, and after valve 100 is closed and any flame in the intake manifold has been put out, as by shutting off the air through closing the throttle, the engine is operated on the oil fuel through ignition in the engine cylinders.

While I have shown a variety of manually controlled devices to make the disclosure of the operation simple and clear, it will be understood that these arrangements can be varied, as by combining several controls, and in other ways.

Fuel delivered through pipe 64 for engine idling and for purposes of compensation during low part load operation, is supplied from the float chamber 58 through the round metering jet or hole 106. The liquid fuel, after passing through the jet opening 106, is aerated by air admitted through the air vent opening at 108 of predetermined section which communicates with passage 110, the lower end of which is located below the level of the fuel in the chamber 58. Passage 112 vented to atmosphere serves to keep the fuel level about the tube 114, containing the idling fuel jet opening 106 the same as within the float chamber 58, or tube 114 may extend directly into the chamber 58.

The idling fuel, preliminarily aerated and broken up by air bled thereinto, through opening 108, has additional air admitted and bled thereinto by means of the adjustable air bleed valve 116, and such doubly air bled fuel is delivered through the passage 20 and discharged against the hot dome 42 in the annular crucible 44. With this arrangement, the fuel is supplied through passage 20 at idling and other times when the intake depression is high, but with reduced intake depression the fuel is not lifted in pipe 64 and only air is bled in through passage 20, or if liquid fuel should accumulate in the well 44, as for example, upon pumping in fuel for rapid acceleration, it can run back when the intake depression is low through pipe 64 to the supply chamber 58.

The fuel supply for the main fuel nozzle 18 coming through pipe 72 in response to depression of pressure about the nozzle 18, is delivered past the normally open check valve 120 in the piston 122 of the acceleration pump 124, the piston stem 126 whereof is connected by link 128 to the throttle lever 130, the arrangement being such that fuel can normally flow through pump 124, but upon any quick opening movement of the throttle, acceleration fuel from the pump chamber 132 is driven forcibly through the annular orifice surrounding the metering pin 134 into passage 136, and thence supplied through the holes 138 to the main fuel nozzle 18.

The control of metering pin 134 is preferably by pressure responsive device such as the bellows 140, of Fig. 3, or the diaphragm 142 of Fig. 5. I preferably use a diaphragm with a single spring 143 when making use of compressed air from the compressor for actuating the fuel metering pin 134, as by connecting a branch 148 from the air compressor 90 to the pressure chamber 142', the opposite side of the diaphragm being vented to the atmosphere at 142''. With the arrangement of Fig. 3, the chamber 144 around the bellows is in communication with a source of super-atmospheric pressure, which varies directly with the weight of charge passing through the engine, as, for example, it may communicate with the exhaust manifold through pipe 146. The space within the bellows 140 is vented to the atmosphere at 150, so that the metering pin 134 secured to the bellows 140, is moved in the direction to increase the fuel passage area by increase in the pressure difference between the atmosphere and the fluid pressure within the chamber 144 surrounding the bellows. Such valve opening movement is opposed initially by the inner relatively lighter spring 152, guided upon a tube 154 and later by both said spring 152 and the outer, heavier spring 156 having an initial clearance before being contacted by the parts moving with valve 134 and being guided by the outer tube 158 of sufficient length to prevent interlocking of the coils of the concentrically arranged springs 152, 156. The valve 134 has a shoulder 160 thereon, and is positively moved near idling position towards closing position, by engagement of lip 162 on shaft 164 with shoulder 160, which shaft is linked to turn with the throttle 12 by the link 166 (Fig. 1). Said shaft 164 has a cam 168 formed thereon to insure positive opening movement of valve 134 taking place upon opening movement of the throttle. The cam nose 168 thereon engaging disc 170 of valve 134 is so arranged as to positively cause opening movement of valve 134 from idling position upon initial opening movement of the throttle, and serves to insure that the valve 134 has at least a predetermined minimum opening for any given throttle opening, beyond which minimum valve 134 can, of course, be moved, against the springs, by the pressure responsive means.

The blasting of the fuel through the main nozzle 18 is accomplished by a fluid under pressure, preferably compressed air, discharged through the interior nozzle 171, and the nozzles may be of various forms, according to the work they are to accomplish. For example, in Fig. 8, a straight sided cylindrical fuel passage 18' of relatively large diameter is provided, adapted for producing very fine break-up of the fuel, and in Fig. 7, the fuel nozzle 18'' is reduced on a taper immediately beyond the air nozzle 171, leading to a straight sided cylindrical bore portion of smaller diameter, such arrangement being better adapted for inductive fuel lifting.

The air from the compressor is delivered to the air nozzle 171 through the pipe 98. Air is bled into the fuel in chamber 136 after the liquid fuel has passed the annular orifice controlled by the metering valve 134. The air bleed passage 172 provided for this purpose is controlled by the taper valve 174, which is urged towards its closed position by spring 176, having a tension sufficient to close valve 174 at low speeds when the intake depression is under about 1½'' of mercury, maximum induction then being required to lift the fuel from the low level float chamber 58, and valve 174 is urged towards its open position by the pressure responsive device 178 exposed on its upper side through passage 180 to reduced pressure in the engine intake, and having a passage 182 on its lower side communicating to the atmosphere, and serving when the valve 174 is opened to communicate to the fuel chamber 136 through the air bleed passage 172.

The admission of air to passage 182 is through atmospheric vent opening 182ᵃ of predetermined area less than the maximum opening around valve 174, and adjustable as by replacement of various size jets provided for this purpose.

In this way, the air bleed opening is constant for intake depression values in excess of a predetermined intake depression, and when the intake depression is less than such predetermined value the bleed opening is correspondingly less, while with intake depression at of about 1½'' of mercury the air bleed opening to the main fuel nozzle is closed.

My process for suspending fuel of low volatility in the air of the charge and maintaining same in suspension will now be readily understood in connection with the described apparatus.

I thoroughly pulverize the heavy fuel oil for load range operation, preferably by blasting it inductively into the air stream in the direction of air flow to the engine cylinders. For the blasting fluid I preferably use air compressed by the engine, and so supplied under pressure varying directly with the engine speed. This variation in blasting pressure produces a corresponding variation in the fuel flow rate, which is in accord with the engine requirements. The induction so obtained can be used in conjunction with the intake depression for securing substantially uniform fuel lifting throughout the range of engine operation if desired. By locating the fuel nozzle in a Venturi throat of the air supplying conduit, I am enabled to influence fuel flow rate to vary directly with variation of the air supply, and this is likewise in accord with the engine requirements for fuel.

When using a butterfly throttle 12, I use it to throttle the air alone, and locate the fuel blasting nozzle inside the throttle, where the fuel blast is not obstructed by the throttle. In this way, there is no danger of clogging or locking the throttle by refrigeration of water vapor thereon.

At part engine load, fuel pulverization by air blast is improved and supplemented by the fuel discharge from nozzle 18 being direct into the region of subatmospheric pressure inside of throttle. The influence on fuel delivery of changes in such subatmospheric pressure is substantially inverse to fuel requirements of the engine, but I compensate for this by valving control of the fuel passage area, and by bleeding air with the fuel through air bleed vent 172 in quantity varying substantially inversely with the intake depression. By bleeding this air into and admixing it with the fuel prior to blasting, improved pulverization of the fuel by the air blast is secured.

The fuel blasted into and boring through the air stream by reason of its greater velocity is very thoroughly pulverized, and by reason of its resulting great surface exposure to the air absorbs heat therefrom very rapidly. Rapidity of heat absorption is of utmost importance because of the extremely short interval of time available and which is longest with the slow charge travel during engine idling and shortest with the high speed charge travel encountered at full power operation. The heavy fuel used of course is capable of taking up more heat than on operation with lighter and more volatile fuels. The air heat of the charge is thus reduced so as to favor having high density charge productive of good volumetric efficiency, and the fuel is in large part put into such condition—gasified and/or vaporized and/or in fogged or like highly divided state,—that it is suspended in and carried along with the air stream without condensation or deposition on the conduit walls as the air stream branches or changes direction on its way to the engine cylinders.

The stream of blasted fuel of low volatility usually contains some fuel portions or droplets heavy enough to continue their substantially straight line travel from the blasting nozzle without material deflection by the moving air. Unless given a liberal application of heat, this fuel portion would wet and load up the walls of the intake manifold.

By changing the direction of the intake manifold passage in the neighborhood where the fuel blast strikes the conduit walls, I can carry the fuel suspended in the air stream towards the engine cylinders with the air stream, and by applying heat of the exhaust gases at the neighborhood where the intake conduit walls would otherwise be wetted by blasted and deposited fuel droplets, I am enabled to secure a selective application of heat to vaporize and suspend this fuel without undesirably heating the air of the charge.

The illustrated mode of securing such effect is by directing the fuel blast downwardly in the intake manifold neck 34, which at the bottom branches to each side, while applying heat of exhaust gas about such neck by surrounding it with an exhaust gas chamber 36 vented to the atmosphere by the outlet pipe 38, thus providing a hot surrounding wall adapted to be contacted by and apply heat to the heavy particles of fuel spreading to the outer region of the blast fuel stream (especially when spread by surrounding the fuel nozzle with a venturi); and by providing the hot cup or crucible 40, hot dome 42 composed of a metal of relatively high thermal conductivity productive of spheroidal vaporization, and hot annular well 44 located in line with the mouth of fuel jet 18, where they are struck by and supply vaporizing heat to the heavy fuel particles in and adjacent to the central portion of the blasted fuel stream.

By the combined effect of the forcible contact of the blasted fuel particles upon these wall surfaces, and the efficient application of heat thereto, the homogeneous suspension of the fuel in the air is completed, without undue air heating and loss of volumetric efficiency through air heating and charge density reduction.

To maintain the homogeneous suspension of the fuel in the air so attained, I keep the sectional area of the intake manifold, and, therefore, of the moving charge stream as low as practicable without unduly restricting charge flow through the manifold, thus keeping the charge moving rapidly and avoiding any slowing up or expansion of the charge material on its way to the engine cylinders; which would be productive of condensation, and I also preferably progressively increase the charge velocity during such travel, as by progressive reduction of the cross-sectional area of the manifold branches from the common neck portion thereof to the engine cylinders, and arrange to supply heat to such parts of the intake manifold wall as would be most readily wet by wet particles of fuel in the charge stream.

The illustrated mode of securing this effect is by making the intake manifold floor and exhaust manifold top wall as a single integral wall with a trough 47 therein of section tapering from least at the outer ends of the intake manifold branches to largest area where it leads down into the annular well 44. This decrease in section of the intake manifold speeds up the charge as it travels to the engine cylinders thereby opposing any tendency of fuel particles to deposit on the walls. Any fuel deposit that does take place finds its way by gravitation to the hot floor trough, where the fuel is immediately vaporized; and any heavy fuel particles traveling in straight lines lengthwise of the intake manifold branches contact the hot ends 150' and 152' of the intake branches and are flashed into vapor. Such ends or elbows are preferably made with smoothly rounding turns to promote fuel travel velocity and fuel charge delivery to the cylinders. The troughs 47 serve also as a sort of anti-rifling device to prevent spiraling of the charge in the branches, which is desirably to be avoided since it would give increased length of travel for any fuel particles and increase wall contact and liability of coalescence of fine fuel particles into larger particles or droplets, which, when formed, could be deposited on the conduit walls.

I vent the annular well 44 to the atmosphere at its bottom through passage 20 so any liquid fuel which may run back through troughs 47 and accumulate in well 44, as for example, at starting, or upon pumping in extra fuel for acceleration, will not simply boil or distill off, but can either run out through such vent, or, in case the intake depression is relatively high, be carried along upwardly as vapor with air admitted through the air bleed opening 20. This opening 20 to the bottom of the crucible well 44 is also preferably used for supplying idling fuel, but such use does not interfere with the functions just described. The venting of the well and the supply of idling fuel can, of course, be through separate openings to well 44 if desired.

During engine operation within the ordinary load ranges of operation, the heat supplied to the charge within the cylinders from admixture therewith of residual unscavenged gases, by absorption from the piston head and cylinder walls, and by heat of compression, is relatively considerable, so that the fuel if delivered in homogeneous admixture with the air is cleanly and fully burned in such state, and smoke production indicative of incomplete combustion eliminated, but I have found that for best operation with fuel of low volatility the cylinder wall temperatures should be as high as practicable with water cooling, and use of high boiling jacket solutions or air cooling with still higher wall temperatures is better.

With a hot engine and using heavy oil fuel, flame wave propagation of a sort to cause detonation may be encountered and I preferably provide piston head and/or combustion chamber walls of stepped or other equivalent formation 27' adapted to allow expansion of the flame wave from the point of ignition so as to avoid or minimize detonation effects, particularly where the compression ratio is high and cannot well be reduced. One such formation is shown and claimed in my copending application Serial No. 440,693, filed April 1, 1930 on which Letters Patent No. 1,814,523 were granted on July 14, 1931. Dual ignition is also useful where detonation is encountered.

During periods of idling at the low idling speeds used in automobile engines, for example, and also during the very low fractional loads, for which I supply the predominant part of the fuel through the idling fuel supply route, the engine operating conditions are quite different from those prevailing in the power range. The air flow is held back by the throttle, the small quantity of air admitted flows relatively slowly through the intake conduit, the charge weight and initial pressure and compression pressure and the heat units of combustion are low, so that there is relatively little current contribution of heat supply to the charge within the cylinder, and in fact the heat flow may be temporarily from the jacket water to the cylinder walls. While the temperature of combustion may not be materially reduced, there is a relatively considerable reduction not only in heat units produced by combustion of the charge due to its small quantity, but also in the temperature at which the exhaust gas is available.

Under these conditions, if the fuel or much thereof is initially merely suspended in the air without being well vaporized, and gets out of suspension in the cylinders or during travel thereto, incomplete combustion, with objectionable smoke of unconsumed oil fuel in the exhaust will ensue, and if the heat reduction is progressive, the engine will not run, as there are practically no readily vaporized low boiling ends in such fuel.

At such times I accomplish delivery of heat to the charge, and effect pulverization and vaporization of the fuel thereof to an extent sufficient to avoid subsequent condensation which would interfere with maintaining the air and fuel in homogeneous admixture, and thereby secure clean practically smokeless consumption of the fuel.

There is at such times no objection to heating the air of the charge since charge density and power production are unimportant, all that is wanted being to keep the engine running and in condition to be put back to work when needed.

Practically no fuel being supplied at such times through the main fuel nozzle 18, as valve 134 is practically closed, the exhaust jacket heat of chamber 36 serves to effectively heat the air for idling which moves slowly through the intake conduit after entering principally through the holes in the throttle provided for the purpose, and through the air blast nozzle which, however, is under low pressure due to the low engine speed. The several air bleed openings, while serving for effective local modification of pressure differences, are practically negligible from the standpoint of furnishing air supply to the engine. By their multiplicity and separated locations they have a material beneficial effect in securing thorough and homogeneous charge admixture. Thus the idling air can be well heated before being brought into contact with the fuel from the idling fuel nozzle 20.

The transition from the atmospheric pressure, to which the fuel is initially subject, to a pressure of around $2/3$ of an atmosphere, present in the intake conduit inside the throttle, serves together with the serial bleedings of air to the idling fuel as at 108 and 116, to produce thorough pulverization of the fuel upon its being delivered directly into such low pressure region so that without need of resort to blasting the idling fuel, (which, however, can be done if desired especially with engines for which fairly rapid idling speed is permissible), the fuel upon delivery to the intake is in pulverized condition adapted for taking up heat from the air and also from the hot dome and crucible walls forming the well walls for the annular well 44 which is the hottest part of the intake conduit and into which the fuel is directly delivered, and the walls whereof are kept up to heat by the concentration of exhaust gas heat on the crucible and dome and massive thermal reservoir skirt member 46.

The travel of the fuel supplied at 20 is from well 44 upward, and with the idling fuel nozzle directly pointed against the side of the hot dome wall as shown, unvaporized or heavy fuel particles, if present, cannot accompany the charge stream, but remain in contact with the heated walls until vaporized and pass on with the charge stream in such state.

That these hot wall surfaces are of sufficient area to supply vaporizing heat to the relatively large quantity of liquid fuel blasted thereagainst during full power operation insures plenty of heat being available when the same walls are used for communicating heat to the small quantity of idling fuel, even though the temperature of such walls during idling is lower than at full load.

The charge so produced in passing to the cylinders takes up heat from the hot floor and ends of the intake passage and upon delivery to the engine cylinders is and remains in condition for efficient, clean and smokeless burning.

I make use of several factors to regulate the quantity of fuel supplied during the various operating conditions. As already explained, the blasting of the fuel by means of fluid pressure varying with the engine speed produces a variation in fuel supply in correspondence with variation in engine speed, also by locating the fuel nozzle subject to the air flow, preferably in a Venturi throat of the air passage, variation of fuel flow with the air flow is obtained, and by bleeding air to the fuel prior to blasting through a bleed opening varying in area substantially inversely with changes in intake depression, I counteract the natural tendency toward delivery of fuel inside the throttle in increasing quantities with increase of intake depression, which would be contrary to engine needs. I shut off this bleed, however, at about 1½ inches of mercury intake depression or lower. This is to avoid undue leaning out of the mixture at low speeds and during full power operation at substantially wide open throttle. Under such conditions increase in engine speed is the main factor in producing an increase in intake depression, and intake depression changes due to speed changes are substantially in accordance with the changing fuel requirements. Since the blasting of the fuel from a source of pressure varying directly with the engine speed, and also the variation directly with the air flow are available to vary the fuel in the right direction, and also, as will be seen, the valving fuel opening is increased with increase of engine speed and of fuel requirements, it is sufficient merely to shut off the air bleed opening whenever the induction on the fuel nozzle is not sufficient to lift the fuel at low depression, viz, about 1½" of mercury, and thereby avoid the fuel reduction that would go with having the air bleed open at such times.

With the fuel metering valve controlled so that the fuel passage area varies substantially directly with the variations in exhaust gas pressure, or in air pressure varying as a function of engine speed, the resulting variations of fuel supply is either in accordance with variation of weight of charge or in engine speed, and in each case substantially in accordance with changes in fuel requirements. Should any lag of pressure occur, control of the fuel valve by the cam mechanically operated by the throttle insures the fuel metering pin being in position that will produce a fuel passage opening sufficient to supply at least the minimum fuel requirements for operation at the corresponding throttle opening.

The several factors so entering into the fuel metering or proportioning during the power range are desirably to be arranged, formed and adjusted so as to get best conditions for the power range. If it is attempted to control the fuel for idling and very low fractional loads through the same factors, the construction and adjustments must be highly refined. I accordingly avoid undue refinement and secure simple construction and uncomplicated adjustment by supplying fuel for idling and low fractional load operation separately from the main fuel supply, and in this way I can arrange and make adjustment for either without reference to the other. This enables me to make use of a round jet hole for the supply of fuel for idling, instead of supplying same through the annular passage around valve 134 which for supplying the small quantity of fuel required for slow idling, of an automobile, for example, in response to the high intake depression existent at idling would be so narrow as to set up undue frictional retardment to fuel passage with severe fluctuation in fuel supply and in engine operation.

At idling and during transitional periods, i. e., just out of idling, I supply the fuel principally through the idling route and maintain sufficient suction on main fuel line to prime up to the main metering source without appreciable delivery. While the air bleed hole may be varied inversely to and by intake depression throughout the range of engine operation, if desired I can and preferably do use a fixed air bleed hole during periods of idling and fuel compensation blending into a varying size bleed hole as the taper air bleed valve begins to close off from its largest opening upon decrease in intake depression.

As the annular fuel passage controlled by the metering pin opens, either mechanically from throttle movement or by pressure actuation, the idling fuel should begin to shut off, and I secure this result simply and automatically by venting the idling fuel jet to the air preferably by two vents arranged in series and so arranged that, with the high intake depression there is at idling, the requisite fuel will be supplied by being lifted through a predetermined distance and as the intake depression is reduced the fuel flow to the idling nozzle 20 will decrease, and finally, at a predetermined reduction of intake depression, will cease entirely and when the uniform fuel flow and supply is established through the main nozzle, only a small quantity of air be supplied through the idling and compensating nozzle.

My invention is not limited to burning of oils such as fuel oil but can be applied to other fuels such as gasoline and those requiring high quantity heat input to accomplish satisfactory air compensation, alcohol, for example.

I claim:

1. In apparatus for supplying and mixing charges for internal combustion engines, an intake, a throttle therein, means for delivering fuel into the intake beyond the throttle, means varied as a substantially pure function of engine speed for varying the fuel flow directly therewith, and means for varying the fuel flow in inverse relation to the variations in intake depression.

2. In apparatus for supplying and mixing charges for internal combustion engines, an intake, a throttle therein, means for injecting fuel into the intake beyond the throttle by the action of a gaseous medium varying in injecting action substantially as a pure function of engine speed and directly therewith, and means for varying the fuel flow substantially as a direct function of engine load.

3. In apparatus for supplying and mixing charges for internal combustion engines, an intake, a throttle therein, means for injecting fuel into the intake beyond the throttle by the action of a gaseous medium varying in injection action substantially as a pure function of engine speed and directly therewith, and means for varying the fuel flow by and in inverse relation to the variations in intake depression.

4. In apparatus for supplying and mixing charges for internal combustion engines, an intake, a throttle therein, means for varying the fuel flow substantially as a function of engine speed and directly therewith, and means for controlling the fuel flow directly with the variations in pressure of a medium varying in pressure substantially as a direct function of both engine speed and load.

5. In apparatus for supplying and mixing charges for internal combustion engines, an intake, a throttle therein, means for varying the fuel flow substantially as a function of engine speed and directly therewith, and means for controlling the fuel flow directly with the variations in pressure of a medium varying in pressure substantially as a direct function of both engine speed and load, and means for further varying the fuel flow substantially in inverse relation to and by the variations in intake depression.

6. In apparatus for supplying and mixing charges for internal combustion engines, an intake, a throttle therein, means for injecting fuel into the intake beyond the throttle by the action of a gaseous medium varying in injecting effect directly with the engine speed, and means for varying the fuel flow directly with the variations in pressure of a medium varying in pressure substantially as a function of both engine speed and load.

7. In apparatus for supplying and mixing charges for internal combustion engines, an intake, a throttle therein, means for injecting fuel into the intake beyond the throttle by the action of a gaseous medium varying in injecting effect directly with the engine speed, and means for varying the fuel flow directly with the variations in pressure of a medium varying in pressure substantially as a function of both engine speed and load, and means for varying the fuel flow by and in inverse relation to the variations in intake depression.

8. In apparatus for supplying and mixing charges for internal combustion engines, an intake, means for blasting fuel principally during engine operation other than idling into said intake by the injector action of a gaseous fluid, and means for discharging fuel into the intake at idling independently of the fuel blasting means.

9. In apparatus for supplying and mixing charges for internal combustion engines, an intake having a downdraft portion, means for blasting fuel through said downdraft portion in the direction of air flow therein, and means for supplying idling fuel into said intake in the opposite direction to the flow of air through said downdraft portion.

10. In apparatus for supplying and mixing charges for internal combustion engines, an intake having a throttle, a fuel discharge nozzle extending into said intake beyond the throttle and subject to the variations in intake depression, means for discharging a gaseous medium in inductive relation to said fuel nozzle, and a separate idling fuel orifice beyond the throttle through which fuel is supplied by intake depression without reliance upon the injector action.

11. In apparatus for supplying and mixing charges for internal combustion engines, an intake having a heated portion, means in said intake, and spaced away from the heated portion, for blasting fuel in the direction of said heated portion, and means in close relation to said heated portion for supplying fuel for idling.

12. In apparatus for supplying and mixing charges for internal combustion engines, an intake having a downdraft portion and a heated portion at the base of said downdraft portion, means for blasting fuel through said downdraft portion for impingement on said heated portion, and an idling fuel orifice at said heated portion.

13. In apparatus for supplying and mixing charges for internal combustion engines, an intake having a downdraft portion and a heated portion at the base of said downdraft portion, means for blasting fuel through said downdraft portion for impingement on said heated portion, and an idling fuel orifice at said heated portion, said orifice also serving to drain fuel from said heated portion.

14. In apparatus for supplying and mixing charges for internal combustion engines, an intake having a downdraft portion, and a heated crucible at the base of said downdraft portion, means for blasting fuel through said downdraft portion for impingement in said crucible, and an idling fuel orifice communicating with said crucible at the base thereof.

15. In apparatus for supplying and mixing charges for internal combustion engines, an intake having a downdraft portion, a throttle therein, means beyond said throttle for blasting fuel through said downdraft portion in the direction of air flow, means for discharging gases in inductive relation to the discharge end of said nozzle for elevating the fuel and discharging the same into the region of intake depression, means for controlling the fuel passage area of said nozzle, a fuel discharge orifice for idling exposed to maximum intake depression, and a fuel receptacle communicating with said fuel discharge nozzle and said idling orifice, said idling orifice and the passage thereto from the fuel receptacle being continuously open and of sufficient diameter to supply fuel for idling without pulsating effect as the fuel passage area of the main nozzle decreases when intake depression approaches maximum.

16. In apparatus for supplying and mixing charges for internal combustion engines, an intake having a main fuel nozzle, an idling fuel orifice and a fuel discharge nozzle for use in preheating, a low level fuel receptacle communicating with said main nozzle, said idling orifice and said fuel nozzle for preheating, means for discharging a gas under pressure in inductive relation to said main discharge nozzle and said preheating nozzle, and means for controlling the passage of fuel and injecting gases to said nozzles.

17. In apparatus for supplying and mixing charges for internal combustion engines, an intake having branches and an entrance portion thereto, a fuel nozzle extending into said entrance portion for supplying fuel during power operation of the engine, an auxiliary fuel nozzle extending into said intake, means for supplying a gas under pressure to said nozzles in inductive relation thereto, a fuel receptacle for supplying fuel to said nozzles, and a valve for controlling the passage of injecting fluid to said nozzles and adapted to close off the fluid to the main nozzle when the auxiliary nozzle is in use and vice versa.

18. In apparatus for supplying and mixing charges for internal combustion engines, a downdraft intake, a fuel nozzle disposed in said downdraft intake and directed downwardly in the direction of air flow, an idling fuel supply orifice at the lower portion of said downdraft intake below said fuel nozzle, a fuel receptacle located at a point below said fuel nozzle and said orifice and communicating with both thereof, suction means associated with said fuel nozzle for drawing fuel from said receptacle as the intake depression decreases, and said idling orifice being located at an elevation relative to said receptacle to be operative in supplying fuel in response to intake depression when same is at or near maximum.

19. In apparatus for supplying and mixing charges for internal combustion engines, an intake, means for supplying fuel thereto, pressure responsive means for controlling the fuel flow comprising a plurality of concentrically arranged coil springs, one of said springs being effective in opposing movement of said pressure responsive means over a portion only of the range thereof, and means interposed between the springs for preventing interlocking of the coils thereof.

20. In apparatus for supplying and mixing charges for internal combustion engines, an exhaust manifold, an intake manifold having an entrance passage and a recessed portion opposite said entrance passage extending into the exhaust manifold and heated by the exhaust gas stream, means in said entrance portion intermediate the throttle and the intake manifold branches for blasting a stream of comminuted fuel in the direction of said recessed portion, and means for supplying idling fuel into said recessed portion.

21. In apparatus for supplying and mixing charges for internal combustion engines, an intake manifold having a recessed portion at the juncture of the branches thereof and troughs at the bases of said branches draining into said recessed portion, means for heating said recessed portion and said troughs, means for blasting a stream of comminuted fuel into the manifold toward said heated recessed portion, and means associated with said recessed portion for supplying fuel thereto for idling, and serving at other stages of operation for draining fuel or admitting air according to the intake depression prevailing within the intake.

22. In apparatus for supplying and mixing charges for internal combustion engines, an intake manifold having a heat jacketed entrance portion and a heating portion opposite said entrance portion, means for blasting a stream of comminuted fuel through said jacketed portion toward said heated portion, means for controlling the passage of fuel through said blasting means, and an idling orifice for supplying fuel into the intake at idling whereat said control means substantially closes off fuel supply to said blasting means, said blasting means during power operation of the engine serving to prevent undue heating of the air by said jacketed portion and at idling said heat jacketed portion serving to heat the incoming air whereby to homogenize the idling charge and assist in the vaporization thereof.

23. In apparatus for supplying and mixing charges for internal combustion engines, integrally formed exhaust and intake manifolds, the lower side of the intake manifold and the upper side of the exhaust manifold having a common wall portion heated by the exhaust gas stream, and including an annular outer portion and dome shaped inner portion forming an annular recess opening into the intake manifold and extending downwardly into the confines of the exhaust gas manifold, and means for blasting a stream of comminuted fuel through said entrance toward said dome and annular recess.

24. In apparatus for supplying and mixing charges for internal combustion engines, an intake manifold having trough portions extending along the lower side of the branches thereof, and a central annular recessed portion, the inner ends of said trough portions leading into said recessed portion, an exhaust gas manifold disposed below said intake manifold and receiving said trough and recessed portions, and means for blasting a stream of comminuted fuel through the entrance of the intake manifold toward said recessed portion.

25. In apparatus for supplying and mixing charges for internal combustion engines, an intake conduit having a downdraft entrance portion and branches, an exhaust manifold disposed in thermal conductive relation to the lower side of said intake, the portion of said intake at the base of said entrance portion comprising a tubular portion extending downwardly into the exhaust conduit, and a dome shaped portion extending upwardly within said tubular portion and forming an annular recess therebetween opening into the intake conduit, means for blasting fuel downwardly through said entrance portion for impingement on said dome, and an idling discharge orifice communicating with the lower end of the annular space about said dome for supplying fuel at idling.

26. In apparatus for supplying and mixing charges for internal combustion engines, an intake, means for conducting fuel into the intake, means for controlling supply of air to the intake, valve means operated by exhaust gas pressure for controlling the fuel passage area directly therewith, and means operated adjunctively with the control of the air supply at low fractional loads for mechanically moving said valve means in both directions.

27. The process of fueling an internal combustion engine which comprises injecting fuel principally at engine operation other than engine idling operation into the air stream in a finely divided state, and posterior to the point of fuel introduction heating the same by exhaust gas, and at or near engine idling operation introducing the fuel into the air stream in closer proximity to the source of heat.

28. The process of fueling an internal combustion engine which comprises forcibly injecting fuel into the air stream at a velocity in excess of the air stream velocity, and subjecting the same to heat, whereby to vaporize the fuel by the conjoint effects of injection, air resistance and heating and as the air resistance becomes less at the periods of relatively high intake depression independently introducing the fuel for engine idling by intake depression subject to the vaporizing effect of heat and relatively high vacuum.

29. The process of fueling an internal combustion engine which comprises effecting fuel delivery and suspension thereof in the air stream by forcibly injecting fuel into and through the air subject to heat varying in inverse relation to the engine load and at a point anterior to the heating source, and at times of relatively low heating effect introducing fuel by intake depression in closer relation to the heating source and into the region of relatively high intake vacuum.

30. The process of fueling an internal combustion engine which comprises subdividing the air stream in the passage thereof to the engine cylinders, injecting fuel into said air stream in the direction of flow thereof at a point anterior to the junction with the subdivided streams, subjecting the projected fuel at said junction to the action of a heating medium varying in temperature with the load, and at relatively low temperatures of said medium introducing the fuel into the air stream substantially at said junction to render the heating medium more effective thereon.

31. Process of fueling an internal combustion engine which comprises subdividing the air stream in the passage thereof to the engine cylinders, injecting fuel principally at periods of engine operation other than idling into said air stream in the direction of flow thereof at a point anterior to the junction with the subdivided air streams, and at and near idling operation introducing fuel by intake depression at the opposite side of said junction for delivery into said air stream.

32. The process of fueling an internal combustion engine which consists in delivering air into the engine cylinders and exposing a portion of the stream thereof circumferentially to heat, injecting fuel into the air stream principally at engine operation other than idling at a point anterior to said heat exposed portion and, because of heat absorption by the atomized fuel, forming a substantially cool mixture for delivery to the engine, and at idling operation introducing the fuel posterior to the heat exposed portion and rendering the circumferential heat available for heating the air entering into admixture with said idling fuel.

33. The process of fueling an internal combustion engine comprising pulverizing non-volatile liquid fuel principally during engine operation other than idling and projecting the same in the direction of a heated area into and through the air stream going to the engine cylinders, carrying away with the air stream that part of the fuel becoming suspended therein, putting the remaining part in suspension in the air by causing the same to strike said heated surface to absorb heat therefrom, and at or near idling operation introducing fuel by intake depression into the air contiguous to the heated portion.

34. The hereindescribed method of preparing charges for internal combustion engines which consists in conducting the exhaust gas from the sets of cylinders in streams flowing towards each other and causing the same to heat a wall portion at the juncture thereof, continuously supplying air and causing the subdivision thereof for delivery to the sets of cylinders contiguous to said wall portion, blasting fuel into and through the undivided air stream in the direction of said wall portion for causing vaporization of the comminuted fuel particles by the heat from said wall portion, controlling the flow of blasted fuel by fuel passage area variation, and supplying idling fuel by delivery thereof contiguous to said heated wall portion independently of the blasted fuel.

35. The process of fueling an internal combustion engine which comprises blasting relatively nonvolatile fuel by gaseous injection into the air stream principally at engine operation other than idling operation and causing fuel comminution and partial suspension of the particles of fuel in the air stream by the conjoint effect of the gaseous injection and air resistance, changing the direction of the air stream to cause the relatively heavier particles to impinge because of the inertia thereof on a heated surface beyond the path of travel of the air stream to substantially complete fuel suspension in the air stream, and at or near the period of engine idling operation, when the intake depression is high and the air resistance low, effecting fuel delivery contiguous to said heated surface without reliance on gaseous injection and air resistance.

36. The process of fueling an internal combustion engine which consists in blasting fuel into the air stream and causing the fuel particles to impinge on a localized heated area, controlling the extent of opening of the fuel passage to restrict the flow of fuel as the intake depression approaches a maximum, and at such stage of operation transferring the admission of fuel to a point more adjacent to said heated portion and admitting fuel as an air emulsion under the action of intake depression through an ample passage.

37. The hereindescribed process of fueling an internal combustion engine which consists in subdividing the air stream, blasting fuel downwardly into the air stream in the direction of flow thereof, and into a heated crucible located beyond the path of travel of the air stream at the junction with the subdivided streams, and bleeding air into said crucible for assisting the heat in causing vaporization of the fuel particles and the return thereof into the air stream.

38. The hereindescribed process of fueling internal combustion engines which consists in subdividing the air stream and maintaining relatively high velocity thereof into the engine cylinders, blasting fuel downwardly into and through the air stream in the direction of flow thereof, and into a heated crucible located beyond the path of travel of the air stream at the junction with the subdivided streams, controlling the passage of blasted fuel by variation of the fuel passage area, during operation of the fuel blast bleeding air into said crucible, and at or near idling operation supplying the major portion of the fuel as an emulsion into said crucible through a separate orifice of ample area compared to the minimum passage opening for the blasted fuel.

39. The method of supplying and mixing the components of the charge mixture of an internal combustion engine which consists in varying the fuel flow directly with and by the pressure variations in a fluid varying in pressure as a pure function of engine speed, and modifying the action thereof as a function of engine load by and in inverse relation to the variations in intake depression.

40. The method of supplying and mixing the components of the charge mixture for an internal combustion engine which consists in causing variation in fuel flow by the variation in pressure of a gaseous medium varying in pressure substantially as a pure function of engine speed, controlling the passage of air to the engine cylinders, and concomitantly with the control of the air independently modifying the action of said gaseous medium on fuel flow to cause the fuel flow to vary directly with the load.

41. The method of supplying and mixing the components of the charge mixture of an internal combustion engine which consists in introducing fuel into the air stream at the engine side of the throttle, subjected at the discharge end thereof to the aspirating action of a fluid varying in pressure as a pure function of engine speed, introducing air into the fuel line to reduce the fuel flow inducing effects at high speeds, and closing off the introduction of air at low speeds.

42. The method of supplying and mixing the components of the charge mixture of an internal combustion engine which consists in introducing fuel into the air stream in the region of intake depression at the engine side of the throttle subjected to the aspirating action of a fluid varying directly in pressure as a pure function of engine speed, modulating the fuel passage, introducing air into the fuel line to attenuate the fuel flow inducing effects of intake depression at the modulating point, and as the intake depression approaches a minimum causing the same to close off the introduction of air to render the fuel flow inducing effects maximum.

43. The method of supplying and mixing the components of the charge mixture of an internal combustion engine which consists in introducing fuel into the air stream at the engine side of the throttle subjected to Venturi effect and the aspirating action of a fluid varying in pressure as a pure function of engine speed, modulating the passage of fuel, introducing air into the fuel line to attenuate the pressure differential at the modulating point at relatively high depressions in the intake, and closing off the introduction of air in response to intake depression as the latter approaches a predetermined minimum.

44. The method of supplying and mixing the components of the charge mixture of an internal combustion engine which consists in introducing fuel into the air stream at the engine side of the throttle, varying the fuel flow in response to a medium varying in pressure directly as a pure function of engine speed, introducing air into the fuel line to attenuate the fuel flow inducing effect of high intake depression, and reducing the attenuating effect at relatively low depression.

45. In apparatus for supplying and mixing charges for internal combustion engines, an intake, a throttle therein, means for delivering fuel into the intake at the engine side of the throttle, means varied as a substantially pure function of engine speed for varying the fuel flow directly therewith, and means for introducing air into the fuel line and including provision for closing off the air introduction at low depression for increasing the fuel flow.

46. In apparatus for supplying and mixing charges for internal combustion engines, an intake, a throttle therein, means for delivering fuel into the intake at the engine side of the throttle, an air compressor operated by the engine and including provision for discharging the air in comminuting relation to the discharge end of the fuel line, means for modulating the fuel passage, and means for introducing air into the fuel line for reducing the pressure differential at the point of modulation, said last named means being controlled by the intake depression for closing off the air at low depression.

ARLINGTON MOORE.